(12) United States Patent
Mekonnen et al.

(10) Patent No.: US 10,992,342 B2
(45) Date of Patent: Apr. 27, 2021

(54) SIMPLIFIED MULTIMODE SIGNALING TECHNIQUES

(71) Applicant: Intel Corporation, Santa Clara, CA (US)

(72) Inventors: Yidnekachew S. Mekonnen, Chandler, AZ (US); Kemal Aygun, Chandler, AZ (US); Henning Braunisch, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/483,019

(22) PCT Filed: Mar. 1, 2017

(86) PCT No.: PCT/US2017/020293
§ 371 (c)(1),
(2) Date: Aug. 1, 2019

(87) PCT Pub. No.: WO2018/160179
PCT Pub. Date: Sep. 7, 2018

(65) Prior Publication Data
US 2020/0021330 A1    Jan. 16, 2020

(51) Int. Cl.
*H04B 3/32*     (2006.01)
*H04B 3/487*    (2015.01)
*H04L 25/08*    (2006.01)

(52) U.S. Cl.
CPC .............. *H04B 3/32* (2013.01); *H04B 3/487* (2015.01); *H04L 25/08* (2013.01)

(58) Field of Classification Search
CPC .......... H04B 3/32; H04B 3/487; H04L 25/08; H04L 25/0212; H04L 25/49; H04L 25/14; H04L 25/4906; H04L 25/4917; G06F 13/00
See application file for complete search history.

(56) References Cited

U.S. PATENT DOCUMENTS

2014/0003549 A1*    1/2014 Won .................. H04L 25/14
                                                          375/286

OTHER PUBLICATIONS

Braunisch et al.; "Crosstalk Reduction by Matrix Matching." in Proc. IEEE Conf. Electrical Performance of Electronic Packaging and Systems (EPEPS), San Jose, CA, Oct. 25-28, 2015, pp. 209-212.
Braunisch et al.; "Mitigating Crosstalk in Unterminated Channels." IEEE Trans. Components, Packaging, and Manufacturing Technology; Apr. 2017; vol. 7, Issue 4; pp. 526-532.
Broyde et al.; "A New Method for the Reduction of Crosstalk and Echo in Multiconductor Interconnections." IEEE Trans. Circuits Syst. I, Reg. Papers, vol. 52, Issue 2, pp. 405-416, Feb. 2005.

(Continued)

*Primary Examiner* — Dady Chery
(74) *Attorney, Agent, or Firm* — Schwabe, Williamson & Wyatt, P.C.

(57) ABSTRACT

Technology for simplified multimode signaling includes determining first and second self α-terms, cross coupling α-terms, and a delay skew term. For each communication link bundled in groups, the signals can be modulated as a superposition of the signals delayed and weighted based on the first and second self α-terms, the cross coupling α-terms and the delay skew term.

28 Claims, 7 Drawing Sheets

(56) References Cited

OTHER PUBLICATIONS

Choi et al.; "Multimode Transceiver for High-Density Interconnects: Measurement and Validation." in Proc. IEEE Electronic Components Technol. Conf. (ECTC), Las Vegas, NV, Jun. 1-4, 2010; pp. 1733-1738.
Milosevic et al.; "Design of a 12Gb/s Transceiver for High-Density Links with Discontinuities using Modal Signaling." in Proc. IEEE Conf. on Electrical Performance of Electronic Packaging and. Systems (EPEPS), San Jose, CA, Oct. 23-26, 2011; pp. 215-218.
Nguyen et al.; "Propagation Over Multiple Parallel Transmission Lines via Modes." IBM Technical Disclosure Bulletin; Apr. 1990; vol. 32, Issue 11; pp. 1-6.
Yan et al.; "Circuit/Channel Co-Design Methodology for Multimode Signaling " in Proc. IEEE. Electronic Components Technol. Conf. (ECTC), Las Vegas, NV, May 29-31, 2014; pp. 1356-1361.
Yan et al.; "Multimode High-Density Link Design Methodology and Implementation," IEEE Trans, Components, Packaging, and Manufacturing Technol., vol. 6, Issue 8; pp. 1251-1260; Aug. 2016.

\* cited by examiner

SIMPLIFIED MULTIMODE SIGNALING TECHNIQUES

PRIORITY INFORMATION

This application is a 371 U.S. national stage entry of PCT Application Serial No. PCT/US2017/020293, filed Mar. 1, 2017, which is incorporated herein by reference in its entirety.

BACKGROUND

Communication channels are subject to interference from various sources. On common source of interference is cross-talk interference resulting from the signals on adjacent communication links cross-coupling between the adjacent communication links. Cross-talk interference can be reduced using various technique such as increasing the separation between communication links. Cross-talk interference can also be reduced by modulating the signals to inject a signal component that cancels the cross-talk component of the signal. As devices and systems continue to scale to smaller and smaller dimensions, and/or the signaling rate in device and system continue to increase there is a continuing need for improved techniques to reduce cross-talk interference.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

DESCRIPTION OF EMBODIMENTS

Figure 1:
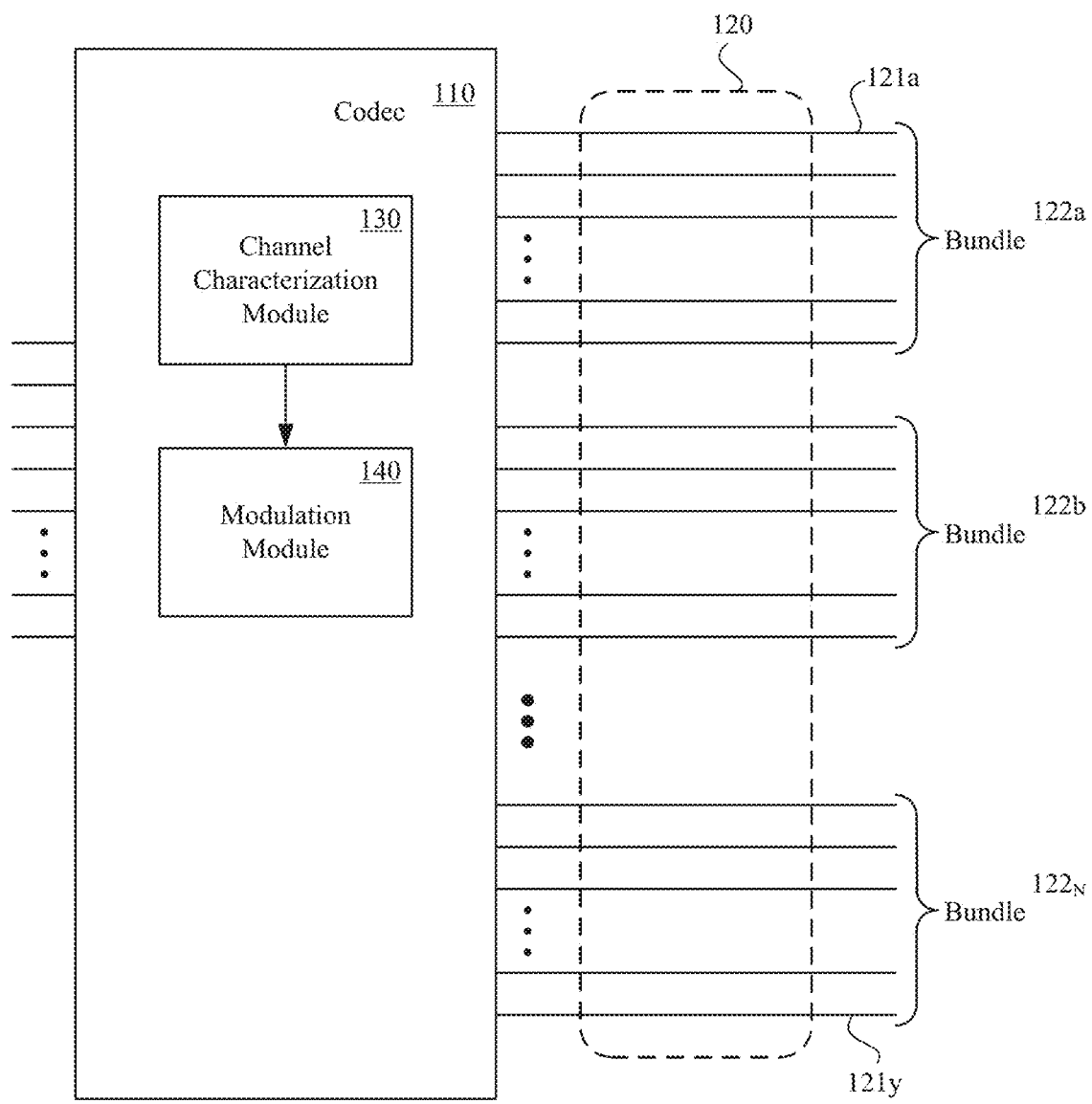
FIG. 1 is a diagram illustrating a system configured to modulate signals to compensate for cross-talk on a communication channel in accordance with an example.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a modulation module" includes a plurality of such modulation modules.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as central processing units (CPUs), graphics processing units (GPUs), digital signal processors (DSPs), microcontroller units (MCUs), embedded controllers (ECs), field programmable gate arrays (FPGAs), or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A simplified multimode signaling technique may include determining channel response parameters for a plurality of communication links of a communication channel, wherein the communication links are bundled in groups (N) of communication links. An input signal for a respective communication link can also be modulated as a function of a first alpha-term. The input signal for the respective communication link in the corresponding group (N) of communication links can be modulated as a function of a modal delay skew term and a second alpha-term. The input signal for each of the other communication links in the corresponding group can be modulated as a function of the modal delay skew term and a cross-coupling alpha-term for the respective other communication links. The modulated input signals for each respective communication link can be combined as an encoder output signal for a corresponding communication link.

FIG. 1 illustrates a system configured to modulate signals to compensate for cross-talk on a communication channel. The system can be configured to encode signals for transmission onto the communication channel or decode signals received on the communication channel. The system 100 can include a codec 110 coupled to a communication channel 120 that includes a plurality of communication links 121$a$-$y$. The term codec 110 as used herein includes an encoder, a decoder, or both the encoder and decoder together. The communication channel 120 can include an address bus, a data bus, a control bus, or any combination thereof. The communication links 121$a$-$y$ can be grouped in a number of bundles 122$a$-$n$ each including N communication links. The number of communication links (N) within each bundle can be between 2 and one half the total number of communication links of the communication channel. A first spacing between communication links 121$a$-$y$ within each bundle 122$a$-$n$ is less than a second spacing between corresponding communication links 121$a$-$y$ in adjacent bundles 122$a$-$n$. The communication links 121$a$-$y$ in each bundle 122$a$-$n$ can be spaced to increase the interconnect density. However, the reduced spacing typically results in increased cross-talk between the communication links 121$a$-$y$ in the bundles 122$a$-$n$. The spacing between corresponding communication links 121$a$-$y$ in adjacent bundles 122$a$-$n$ can be spaced to reduce cross-talk while incurring a relatively small decrease in overall interconnect density for the communication channel 120.

Figure 2:
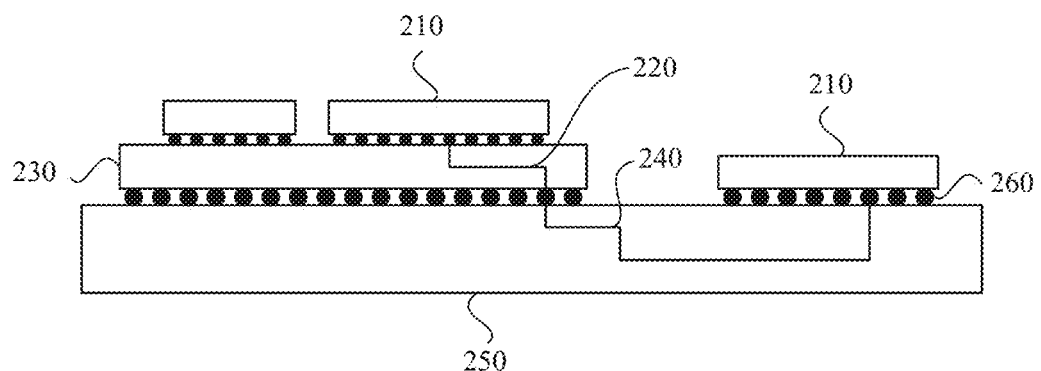
FIG. 2 is a diagram illustrating a communication channel in accordance with an example.

FIG. 2 illustrates a communication channel in accordance with embodiments of the present technology. The communication channel can be an address bus, a data bus, a control bus, or any combination thereof communicatively coupling two or more circuits. The communication channel may include, by way of example but not limited thereto, one or more interconnects within an integrated circuit (IC) die 210, one or more corresponding interconnects 220 through interposers 230, one or more interconnects 240 through printed circuit 250 boards (PCBs), one or more connectors, one or more cables and/or wires, ball grid array connections 260, pin grid arrays, one or more wire bond connections, one or more solder connections, or any combination thereof. Each portion of the communication channel and various parameters, such as the geometries of the interconnects, and physical properties of the interconnects and surround materials, contribute to the cross-talk coupling of signals between the plurality of links of the communication channels.

Referring again to FIG. 1, the codec 110 can include a channel characterization module 130 and a modulation module 140. The channel characterization module 130 can determine one or more channel response parameters for the plurality of communication links 121$a$-$y$. The channel characterization module 130 can, for example, determine a channel response S-parameter matrix. For an N-wire bundle 122$a$-$n$, the channel response S-parameter matrix can be segmented as $$\overline{\overline{S}} = \begin{bmatrix} \overline{\overline{S}}_{11} & \overline{\overline{S}}_{12} \\ \overline{\overline{S}}_{21} & \overline{\overline{S}}_{22} \end{bmatrix}$$

The channel characterization can be determined during a design stage of a device and/or system using circuit design parameters and/or circuit simulation results, which may account for design tolerances. The channel characterization can also be determined during the manufacturing stage using test measurements, which may account for process variations and operational ranges. The channel characterization parameters can also be determined during operation of the device and/or system. For example, the distortion characteristic can be determined during initialization of the device by measuring appropriate parameters during a power-on-self-test or other similar initialization function. The distortion characteristic can also be determined one or more times during normal operation. For instance, the distortion characteristic can be measured periodically, or in response to one or more events. Determining the distortion characteristic periodically or in response to one or more events can advantageously be used for time-variant channels, for example channels subject to changes due to environmental factors such as temperature and humidity or aging.

The modulation module 140 can receive a plurality of input signals for transmission across or received on the plurality of communication links 121*a-y* of the communication channel 120. As used herein the term input signals and output signals are used with respect to the signal processing performed by the modulation module 140. The modulation module 140 can receive input signals from a circuit and generate corresponding output signals for transmission on each respective one of the plurality of communication links pre-distorted based on the determined channel response parameter for each one of the plurality of communication links. Alternatively, the modulation module 140 can receive input signals after transmission on each respective one of the plurality of communication links and generate corresponding output signals compensated to remove distortion based on the determined channel response parameters. Accordingly, the modulation module 140 modifies either the transmitted or received signals, but not both, which is advantageous for application to non-proprietary communication channels. For example, the modulation module 140 can be implemented in a product from one particular manufacturer without the need for changes in products from other manufacturers that are communicatively coupled to the communication channel 120.

Figure 3:
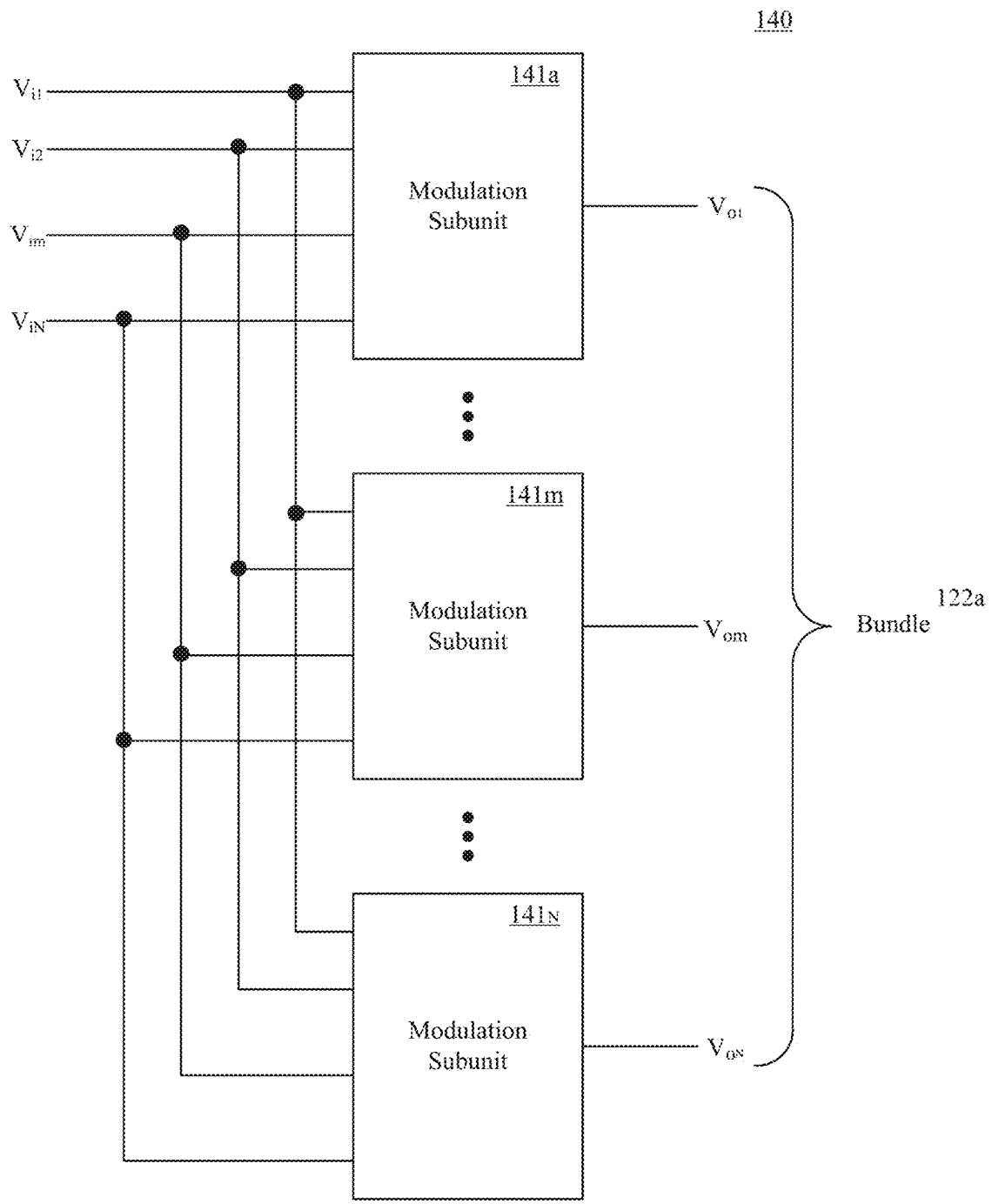
FIG. 3 is a block diagram of a modulation module in accordance with an example.

FIG. 3 illustrates a modulation module 140 with respect to a given bundle 122*a* of communication links 120. The modulation module 140 may include a plurality of modulation subunits 141*a-n*. The modulation subunits 141*a-n* represent physical or logical partitions of the modulation module 140. Each modulation subunit 141*m* can receive the input signals for each of the communication links in the given bundle 122*a* of the communication channel 120. Each modulation subunit 141*m* can generate an output signal for a respective communication link based on the input signals on the communication links within the respective bundle and the corresponding distortion characteristics of the respective communication links within the bundle 122*a*.

The modulation module 140 can be configured to modulate the input signal ($V_m$) for a respective communication link in a corresponding group of communication links as a function of a first alpha-term ($\tilde{\alpha}_{s1}$). The modulation module 140 can also be configured to modulate the encoder input signal ($V_m$) for the respective communication link in the corresponding group of communication links as a function of a modal delay skew term ($\delta_T$) and a second alpha-term ($\tilde{\alpha}_{s2}$). The modulation module 140 can be configured to modulate the encoder input signal ($V_m$) for each of the other communication links in the corresponding group ($V_k$, for $1 \leq k \leq N$, $k \neq m$) as a function of the modal delay skew term ($\delta_T$) and a cross-coupling alpha-term ($\tilde{\alpha}_{xkm}$) for the respective other communication link.

Figure 4:
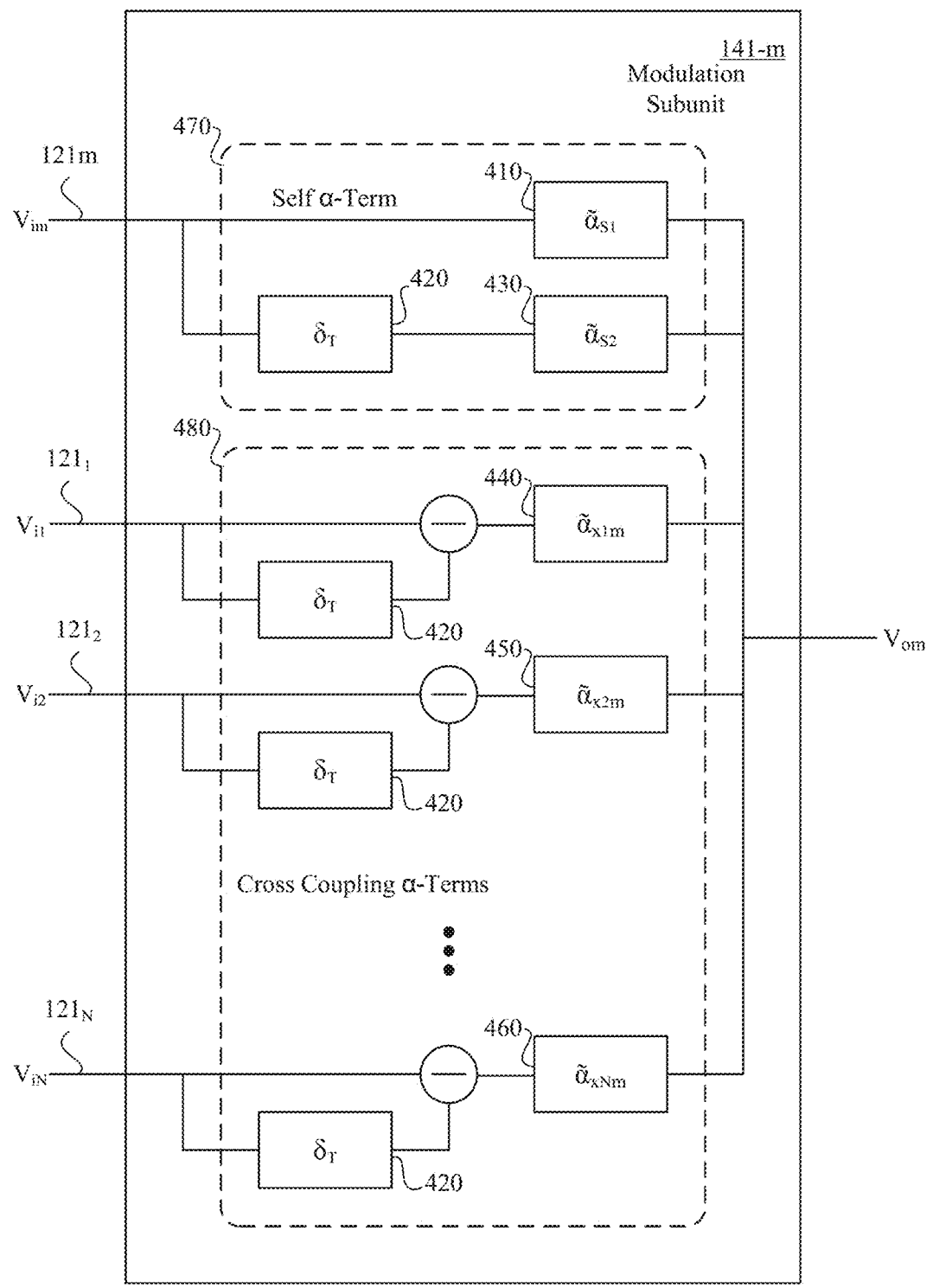
FIG. 4 is a block diagram of a modulation module in accordance with an example.

FIG. 4 shows a superposition of signals delayed and weighted according to the codec parameters for a victim channel in an N-wire bundle. The term victim channel 121*m* as used herein refers to a given communication link that is subject to cross-talk interference from the other communication links in the bundle of communication links. In one instance, the first alpha-term ($\tilde{\alpha}_{s1}$) can be calculated according to Equation 1:

$$\tilde{\alpha}_{s1} = \Sigma_{j=1}^{N_h} \alpha_{kjm} \tag{1}$$

The second alpha-term ($\tilde{\alpha}_{s2}$) can be calculated according to Equation 2:

$$\tilde{\alpha}_{s2} = \sum_{j=N_h+1}^{N_h} \alpha_{kjm} \text{ where } k = m \text{ and} \tag{2}$$

$$N_h = \begin{cases} \dfrac{N}{2}, \text{ for } N \in \text{ even} \\ \dfrac{N}{2} \pm 0.5, \text{ for } N \in \text{ odd} \end{cases}$$

The cross-coupling alpha-term ($\tilde{\alpha}_{xkm}$) can be calculated according to Equation 3:

$$\tilde{\alpha}_{xkm} = \dfrac{1}{N_h} \sum_{j=1}^{N_h} \sum_{i=1}^{j} \alpha_{kim} \tag{3}$$

where $1 \leq k \leq N$, $k \neq m$ and $$N_h = \begin{cases} \dfrac{N}{2}, \text{ for } N \in \text{ even} \\ \dfrac{N}{2} \pm 0.5, \text{ for } N \in \text{ odd} \end{cases}$$

In one instance, the modal delay skew term ($\delta_T$) can be the difference between a maximum modal delay and a minimum modal delay of the bundle.

Again, the modulation subunit 141*m* can be configured to modulate the input signal ($V_{im}$) for a respective communication link in the given group of communication links as a function of a first alpha-term ($\tilde{\alpha}_1$) 410. The modulation subunit 141*m* can modulate the input signal ($V_{im}$) for the respective communication link as a function of a modal delay skew term ($\delta_T$) 420 and a second alpha-term ($\tilde{\alpha}_2$) 430. The modulation subunit 141*m* can modulate the input signal ($V_{1-N}$) for each of the other communication links in the given group ($V_k$, for $1 \leq k \leq N$, $k \neq m$) as a function of the modal delay skew term ($\delta_T$) 420 and a cross-coupling alpha-term ($\tilde{\alpha}_{xkm}$) 440-460 for the respective other communication link. The simplified output voltage of the m-th victim channel $V_{TXm}$ is described as:

$$V_{TXm}(t) = \tilde{\alpha}_{s1} V_m(t) + \tilde{\alpha}_{s2} V_m(t-\delta_T) + \Sigma_{k=1, k \neq m}^{N} \tilde{\alpha}_{xkm}[V_k(t) V_k(t-\delta_T)]$$

The encoder, as describe above with regard to FIGS. 1, 3 and 4, is advantageously implemented with a reduced number of codec parameters as compared to other codecs such as binary multimode signaling (BMS) based codecs. The BMS based codec, for example, can be similarly utilized with a communication channel including a plurality of communication links grouped in a number of bundles. For an N-wire bundle, the channel response S-parameter matrix can be segmented as:

$$\overline{\overline{S}} = \begin{bmatrix} \overline{\overline{S}}_{11} & \overline{\overline{S}}_{12} \\ \overline{\overline{S}}_{21} & \overline{\overline{S}}_{22} \end{bmatrix}$$

A set of coded parameters can be chosen so that:

$$\overline{V}'_S \cong \overline{S}_{21}^{-1} \cdot \overline{V}_S$$

which implements the operation:

$$\overline{V}'_S = \overline{T}_C \cdot \text{diag}(e^{-j\omega \overline{d}_c}) \cdot \overline{U}_C \cdot \overline{V}_s$$

as an approximate inverse of the channel transfer matric, where the columns of $\overline{T}_c$ are eigenvectors of $|\overline{S}_{21}|$, $\overline{U}_c$ is the inverse of $\overline{T}_c$, and $\overline{d}_c$ is the modal delay vector. For N-wire bundle codec parameters, $\alpha$ is defined as $$\alpha_{kjm} = T_{cmk} \cdot U_{ckj}, \text{ where } 1 \leq k, j, m \leq N$$

The total number of $\alpha$ terms related to a single victim channel is $N^2$ and the total number of $\alpha$ terms per N-wire bundle is $N^3$. The total number of modal delay terms associated with an N-wire bundle is $N-1$. One can subtract the smallest modal delay for the rest of the modal delays to eliminate one delay term. For example, for bundles with N=4 communication links, there are 16 $\alpha$ terms per bundle with 3 modal delay terms for the binary multimode signaling (BMS) modulation scheme.

Figure 5:
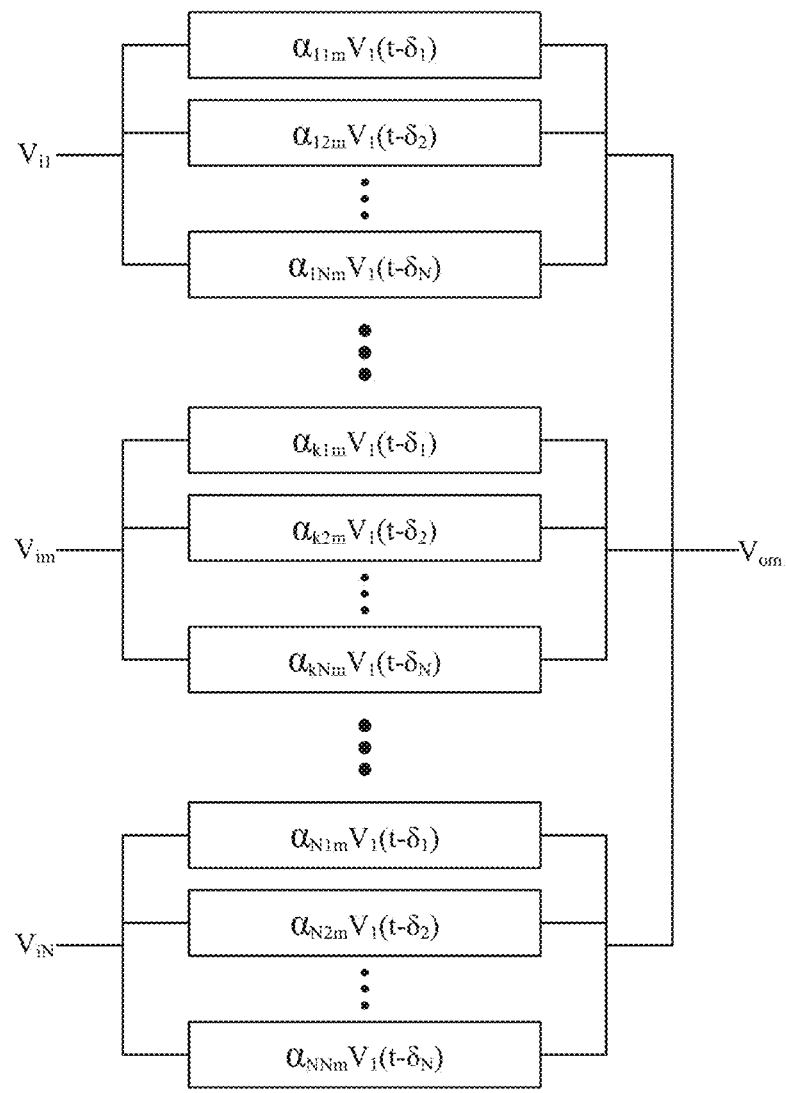
FIG. 5 is a diagram illustrating a binary multimode signaling modulation scheme according to the conventional art.

FIG. 5 shows the superposition of the signal delayed and weighted according to the binary multimode signaling (BMS) codec parameter of a victim channel in an N-wire bundle. The output signal of the m-th victim link can be described as $$V_{TXm}(t) = \Sigma_{k=1}^N \Sigma_{j=1}^N \alpha_{kjm} V_k(t - \delta_j)$$

where $1 \leq k, j \leq N$. The output signal at the m-th victim link in an expanded form can be expressed as:

$$V_{TXm}(t) = [\alpha_{11m} V_1(t - \delta_1) + \alpha_{12m} V_1(t - \delta_2) + \ldots + \alpha_{1Nm} V_1(t - \delta_N)] +$$
$$[\alpha_{k1m} V_k(t - \delta_1) + \alpha_{k2m} V_k(t - \delta_2) + \ldots + \alpha_{kNm} V_k(t - \delta_N)] +$$
$$[\alpha_{N1m} V_N(t - \delta_1) + \alpha_{N2m} V_N(t - \delta_2) + \ldots + \alpha_{NNm} V_N(t - \delta_N)]$$

The output voltage of all the N channels within a bundle can be written in similar fashion (m=1, 2, . . . , N).

Referring again to FIGS. 1, 3 and 4, the modulation scheme simplifies the α term, with respect to binary multimode signaling (BMS), in two parts: self α-terms 470 and cross coupling α-terms 480. For a bundle of N communication links, the simplification of the cross-coupling α-terms 480 eliminates N(N−1) α-terms and eliminates N−1 delay terms, as compared to a binary multimode signaling (BMS) modulation scheme.

Figure 6:
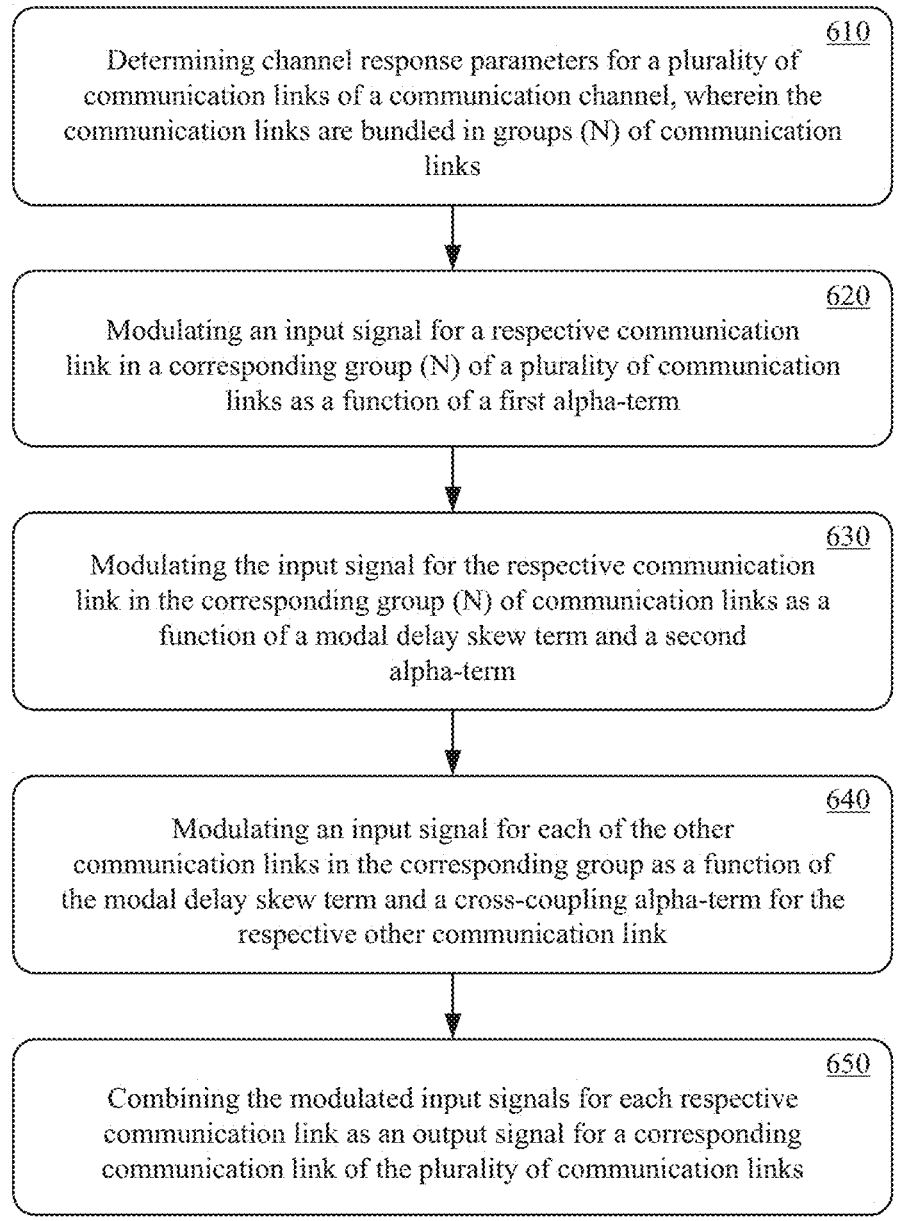
FIG. 6 is a flow diagram of a method for modulating signals to compensate for cross-talk on a communication channel in accordance with an example.

FIG. 6 shows a method of modulating communication signals to compensate for cross-talk on a communication channel. The communication channel can include a plurality of communication links grouped in a number of bundles. In one aspect, channel response parameters for a plurality of communication links are determined at 610. The channel response parameters can be determined as an S-parameter matrix. The channel characterization can be determined during a design stage of a device and/or system using circuit design parameters and/or circuit simulation results. The channel characterization can also be determined during the manufacturing stage using test measurements. The channel characterization parameters can also be determined during operation of the device and/or system.

In one aspect, an input signal ($V_m$) for a respective communication link in a corresponding group of a plurality of communication links can be modulated as a function of a first alpha-term ($\tilde{\alpha}_{s1}$) at 620. The first alpha-term for input signal ($V_m$) can be calculated according to Equation 1 as set forth above.

In one aspect, the input signal ($V_m$) for the respective communication link in the corresponding group of communication links can be modulated as a function of a modal delay skew term ($\delta_T$) and a second alpha-term ($\tilde{\alpha}_{s2}$) 630. The second alpha-term ($\tilde{\alpha}_{s2}$) can be calculated according to Equation 2 as set forth above. The modal delay skew term ($\delta_T$) can be calculated as the difference between a maximum modal delay and a minimum modal delay of the bundle.

In one aspect, the input signal for each of the other communication links in the corresponding group ($V_k$, for $1 \leq k \leq N$, $k \neq m$) can be modulated as a function of the modal delay skew term ($\delta_T$) and a cross-coupling alpha-term ($\tilde{\alpha}_{xkm}$) for the respective other communication link 640. The cross-coupling alpha-term ($\tilde{\alpha}_{xkm}$) can be calculated according to Equation 3 as set forth above.

In one aspect, the modulated input signals for each respective communication link can be combined as an output signal for a corresponding communication link of the plurality of communication links 650.

The method advantageously reduces the codec parameter. For example, the codec parameter may be reduced by approximately 68% for a bundle of N=4, as compared to a binary multimode signaling (BMS) modulation method. The difference in codec parameters in accordance with embodiments of the present technology as compared to the binary multimode signaling (BMS) modulation method is summarized below in Table 1.

TABLE 1

| N-wire Bundle Codec Terms | Binary Multimode Signaling | Embodiments of the Present Technology |
| --- | --- | --- |
| Total Number of α-Terms per Victim Node | $N^2$ | N + 1 |
| Total Number of α-Terms per N-wire Bundle | $N^3$ | (N + 1)N |
| Total Number of Delay Terms | N − 1 | 1 |

The method advantageously reduces the complexity of the modulation scheme with substantially the same level of performance, as compared to the binary multimode signaling (BMS) modulation method. The reduced complexity of modulation in accordance with embodiments of the present technology advantageously reduces power consumption by the implementing hardware, firmware, and/or software executing on a processing unit. The reduced complexity of modulation in accordance with embodiments of the present technology also advantageously reduces the die area for the implementing hardware, firmware, and/or software executing on a processing unit.

Figure 7A:
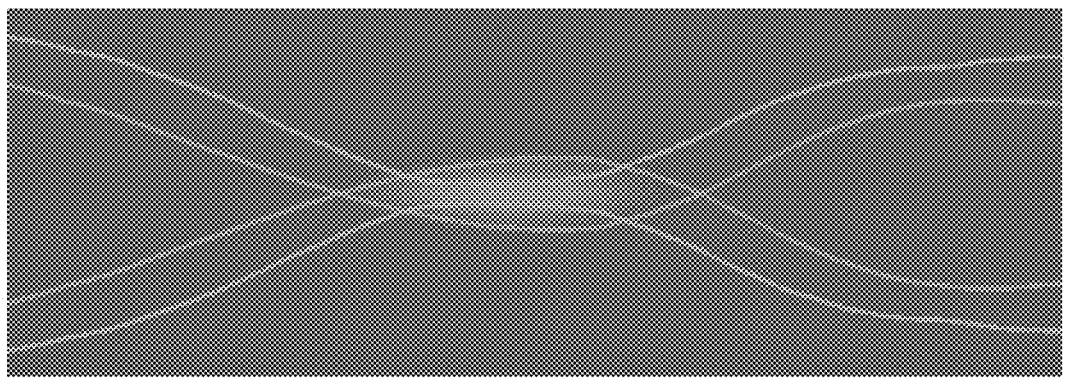
FIGS. 7A, 7B and 7C are diagram illustrating signal margins in accordance with an example.
Figure 7B:
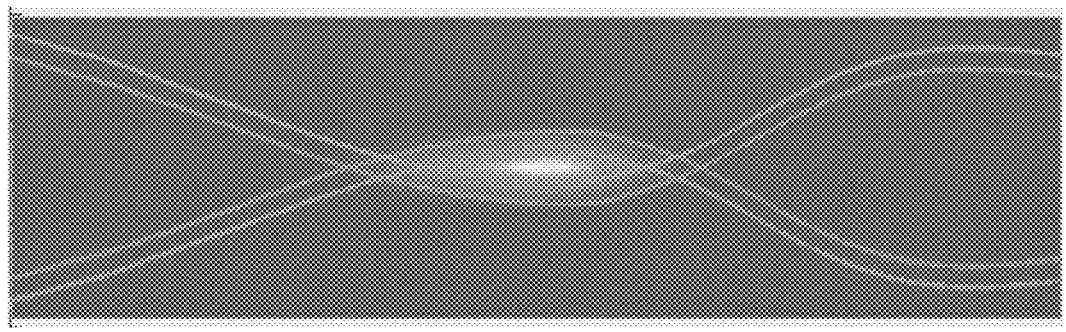
Figure 7C:
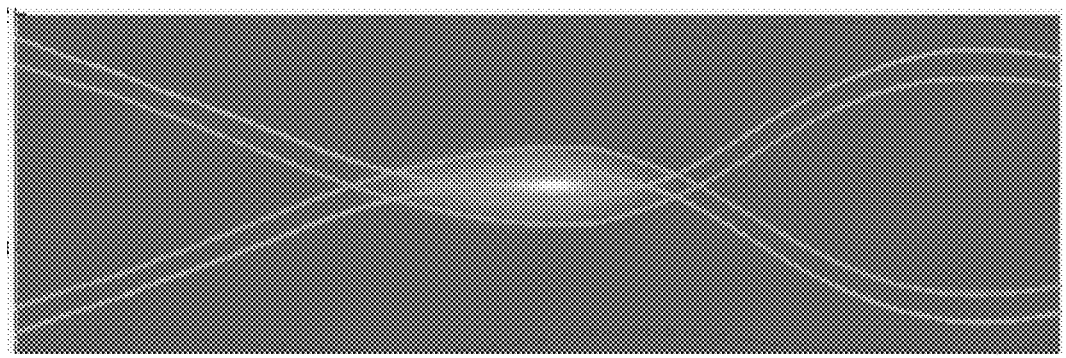

FIGS. 7A, 7B and 7C illustrate a signal on a communication channel. FIG. 7A illustrates the signal of a channel simulation for a system that does not employ a cross-talk modulation scheme. In accordance with the simulation there is no observed margin. FIG. 7B illustrates the signal of a channel simulation for a system that employs binary multimode signaling (BMS) modulation. FIG. 7C illustrates the signal of a channel simulation for a system that employs a modulation scheme in accordance with embodiments of the present technology. As illustrated in FIGS. 7B and 7C, the modulation scheme of the present technology provides substantially the same level of improvement in the margin as the binary multimode signaling (BMS) modulation scheme.

EXAMPLES

The following examples pertain to specific technology embodiments and point out specific features, elements, or steps that may be used or otherwise combined in achieving such embodiments.

Example 1 includes an encoder comprising:

a channel characterization circuit to determine channel response parameters for a plurality of communication links of a communication channel, wherein the communication links are bundled in groups (N) of communication links; and a modulation module to receive a plurality of input signals and generate, based on the determined channel response parameter for each one of a plurality of communication links, a corresponding output signal for transmission on each respective one of the plurality of communication links, wherein the modulation module is configured to, modulate the input signal ($V_m$) for a respective communication link in a corresponding group (N) of communication links as a function of a first alpha-term ($\tilde{\alpha}_{s1}$);

modulate the input signal ($V_m$) for the respective communication link in the corresponding group (N) of communication links as a function of a modal delay skew term ($\delta_T$) and a second alpha-term ($\tilde{\alpha}_{s2}$); and modulate the input signal for each of the other communication links in the corresponding group ($V_k$, for $1 \leq k \leq N$, $k \neq m$) as a function of the modal delay skew term ($\delta_T$) and a cross-coupling alpha-term ($\tilde{\alpha}_{xkm}$) for the respective other communication link.

Example 2 includes the encoder of Example 1, wherein:
for input signal ($V_m$), the first alpha-term comprises $$\tilde{\alpha}_{s1} = \sum_{j=1}^{N_h} \alpha_{kjm},$$

the second alpha-term comprises $$\tilde{\alpha}_{s2} = \sum_{j=N_h+1}^{N_h} \alpha_{kjm} \text{ where } k = m \text{ and}$$

$$N_h = \begin{cases} \dfrac{N}{2}, & \text{for } N \in \text{even} \\ \dfrac{N}{2} \pm 0.5, & \text{for } N \in \text{odd} \end{cases}$$

for input signal ($V_m$), the cross-coupling alpha-term comprises $$\tilde{\alpha}_{xkm} = \frac{1}{N_h} \sum_{j=1}^{N_h} \sum_{i=1}^{j} \alpha_{kim} \text{ where}$$

$$1 \leq k \leq N, k \neq m \text{ and}$$

$$N_h = \begin{cases} \dfrac{N}{2}, & \text{for } N \in \text{even} \\ \dfrac{N}{2} \pm 0.5, & \text{for } N \in \text{odd} \end{cases}.$$

Example 3 includes the encoder of Example 1, wherein the determined channel response parameters include a channel response S-parameter matrix.

Example 4 includes the encoder of Example 1, wherein the modal delay-modulation term comprises a difference between a maximum modal delay and a minimum modal delay of the bundle.

Example 5 includes the encoder of Example 1, wherein the distortion characteristic is determined during a design stage of the device.

Example 6 includes the encoder of Examples 1 or 5, wherein the distortion characteristic is determined during a manufacturing stage of the device.

Example 7 includes the encoder of Examples 1, 5 or 6, wherein the distortion characteristic is determined during use of the device.

Example 8 includes the encoder of Example 7, wherein the distortion characteristic is determined during an initialization of the device.

Example 9 includes the encoder of Example 7, wherein the distortion characteristic is determined periodically during use of the device.

Example 10 includes a method of encoding comprising:

determining channel response parameters for a plurality of communication links of a communication channel, wherein the communication links are bundled in groups (N) of communication links;

modulating an input signal ($V_m$) for a respective communication link in a corresponding group (N) of a plurality of communication links as a function of a first alpha-term ($\tilde{\alpha}_{s1}$);

modulating the input signal ($V_m$) for the respective communication link in the corresponding group (N) of communication links as a function of a modal delay skew term ($\delta_T$) and a second alpha-term ($\tilde{\alpha}_{s2}$);

modulating an input signal for each of the other communication links in the corresponding group ($V_K$, for $1 \leq k \leq N$, $k \neq m$) as a function of the modal delay skew term ($\delta_T$) and a cross-coupling alpha-term ($\tilde{\alpha}_{xkm}$) for the respective other communication link; and combining the modulated input signals for each respective communication link as an encoder output signal for a corresponding communication link of the plurality of communication links.

Example 11 includes the method according to Example 10, wherein:

for input signal ($V_m$), the first alpha-term comprises $$\tilde{\alpha}_{s1} = \sum_{j=1}^{N_h} \alpha_{jkm},$$

the second alpha-term comprises $$\tilde{\alpha}_{s2} = \sum_{j=N_h+1}^{N} \alpha_{kjm}$$

where $$k = m \text{ and } N_h = \begin{cases} \dfrac{N}{2}, & \text{for } N \in \text{ even} \\ \dfrac{N}{2} \pm 0.5, & \text{for } N \in \text{ odd} \end{cases}$$

for input signal ($V_m$), the cross-coupling alpha-term comprises $$\tilde{\alpha}_{xkm} = \frac{1}{N_h}\sum_{j=1}^{N_h}\sum_{i=1}^{j}\alpha_{kim}$$

where $$1 \leq k \leq N, k \neq m \text{ and } N_h = \begin{cases} \frac{N}{2}, & \text{for } N \in \text{ even} \\ \frac{N}{2} \pm 0.5, & \text{for } N \in \text{ odd} \end{cases}.$$

Example 12 includes the method according to Example 10, wherein the determined channel response parameters include a channel response S-parameter matrix.

Example 13 includes the method according to Example 10, wherein the modal delay-modulation term comprises a difference between a maximum modal delay and a minimum modal delay of the bundle.

Example 14 includes the method according to Example 10, wherein the distortion characteristic is determined during a design stage of the device.

Example 15 includes the method according to Examples 10 or 14, wherein the distortion characteristic is determined during a manufacturing stage of the device.

Example 16 includes the method according to Examples 10, 14 or 15, wherein the distortion characteristic is determined during use of the device.

Example 17 includes the method according to Example 16, wherein the distortion characteristic is determined during an initialization of the device.

Example 18 includes the method according to Example 16, wherein the distortion characteristic is determined periodically during use of the device.

Example 19 includes a system comprising:
 a communication channel including a plurality of communication links grouped into multiple bundles, each bundle including a number of communication links;
 a channel characterization circuit to determine channel response parameters for the plurality of communication links; and
 a modulation module to receive a plurality of input signals and generate, based on the determined channel response parameter for each one of a plurality of communication links, a corresponding output signal for transmission on each respective one of the plurality of communication links, wherein the modulation module is configured to,
  modulate the input signal ($V_m$) for a respective communication link in a corresponding group (N) of communication links as a function of a first alpha-term ($\tilde{\alpha}_{s1}$);
  modulate the input signal ($V_m$) for the respective communication link in the corresponding group (N) of communication links as a function of a modal delay skew term ($\delta_T$) and a second alpha-term ($\tilde{\alpha}_{s2}$); and
  modulate an input signal ($V_m$) for each of the other communication links in the corresponding group ($V_k$, for 1≤k≤N, k≠m) as a function of the modal delay skew term ($\delta_T$) and a cross-coupling alpha-term ($\tilde{\alpha}_{xkm}$) for the respective other communication link.

Example 20 includes the system of Example 19, wherein a first spacing between communication links within each bundle is less than a second spacing between corresponding communication links in adjacent bundles.

Example 21 includes the system of Example 19, wherein the determined channel response parameters include a channel response S-parameter matrix.

Example 22 includes the system of Example 19, wherein: for input signal ($V_m$), the first alpha-term comprises $$\tilde{\alpha}_{s1} = \sum_{j=1}^{N_h}\alpha_{kjm},$$

for input signal ($V_m$), the second alpha-term comprises $$\tilde{\alpha}_{s2} = \sum_{j=N_h+1}^{N}\alpha_{kjm}$$

where $$k = m \text{ and } N_h = \begin{cases} \frac{N}{2}, & \text{for } N \in \text{ even} \\ \frac{N}{2} \pm 0.5, & \text{for } N \in \text{ odd} \end{cases}$$

for input signal ($V_m$), the cross-coupling alpha-term comprises $$\tilde{\alpha}_{xkm} = \frac{1}{N_h}\sum_{j=1}^{N_h}\sum_{i=1}^{j}\alpha_{kim}$$

where $$1 \leq k \leq N, k \neq m \text{ and } N_h = \begin{cases} \frac{N}{2}, & \text{for } N \in \text{ even} \\ \frac{N}{2} \pm 0.5, & \text{for } N \in \text{ odd} \end{cases}.$$

Example 23 includes the system of Example 19, wherein the modal delay-modulation term comprises a difference between a maximum modal delay and a minimum modal delay of the bundle.

Example 24 includes the system of Example 19, wherein the distortion characteristic is determined during a design stage of the device.

Example 25 includes the system of Examples 19 or 24, wherein the distortion characteristic is determined during a manufacturing stage of the device.

Example 26 includes the system of Examples 19, 24 or 25, wherein the distortion characteristic is determined during use of the device.

Example 27 includes the system of Example 26, wherein the distortion characteristic is determined during an initialization of the device.

Example 28 includes the system of Example 26, wherein the distortion characteristic is determined periodically during use of the device.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:
1. An encoder comprising:
 a channel characterization circuit to determine channel response parameters for a plurality of communication links of a communication channel, wherein the communication links are bundled in groups (N) of communication links; and a modulation module to receive a plurality of input signals and generate, based on the determined channel response parameters for each one of a plurality of communication links, a corresponding output signal for transmission on each respective one of the plurality of communication links, wherein the modulation module is configured to, modulate the input signal ($V_m$) for a respective communication link in a corresponding group (N) of communication links as a function of a first alpha-term ($\tilde{\alpha}_{s1}$);

modulate the input signal ($V_m$) for the respective communication link in the corresponding group (N) of communication links as a function of a modal delay skew term ($\delta_T$) and a second alpha-term ($\tilde{\alpha}_{s2}$); and modulate the input signal for each of the other communication links in the corresponding group ($V_k$, for $1 \leq k \leq N$, $k \neq m$) as a function of the modal delay skew term ($\delta_T$) and a cross-coupling alpha-term ($\tilde{\alpha}_{xkm}$) for the respective other communication link.

2. The encoder of claim 1, wherein:
for input signal ($V_m$), the first alpha-term comprises $$\tilde{\alpha}_{s1} = \sum_{j=1}^{N_h} \alpha_{kjm},$$

the second alpha-term comprises $$\tilde{\alpha}_{s2} = \sum_{j=N_h+1}^{N} \alpha_{kjm}$$

where $$k = m \text{ and } N_h = \begin{cases} \frac{N}{2}, & \text{for } N \in \text{ even} \\ \frac{N}{2} \pm 0.5, & \text{for } N \in \text{ odd} \end{cases}$$

for input signal ($V_m$), the cross-coupling alpha-term comprises $$\tilde{\alpha}_{xkm} = \frac{1}{N_h} \sum_{j=1}^{N_h} \sum_{i=1}^{j} \alpha_{kim}$$

where $$1 \leq k \leq N, k \neq m \text{ and } N_h = \begin{cases} \frac{N}{2}, & \text{for } N \in \text{ even} \\ \frac{N}{2} \pm 0.5, & \text{for } N \in \text{ odd} \end{cases}.$$

3. The encoder of claim 1, wherein the determined channel response parameters include a channel response S-parameter matrix.

4. The encoder of claim 1, wherein the modal delay-modulation term comprises a difference between a maximum modal delay and a minimum modal delay of the bundle.

5. The encoder of claim 1, wherein the distortion characteristic is determined during a design stage of the device.

6. The encoder of claim 1 or 5, wherein the distortion characteristic is determined during a manufacturing stage of the device.

7. The encoder of claim 1, wherein the distortion characteristic is determined during use of the device.

8. The encoder of claim 7, wherein the distortion characteristic is determined during an initialization of the device.

9. The encoder of claim 7, wherein the distortion characteristic is determined periodically during use of the device.

10. A method of encoding comprising:
determining channel response parameters for a plurality of communication links of a communication channel, wherein the communication links are bundled in groups (N) of communication links;

modulating an input signal ($V_m$) for a respective communication link in a corresponding group (N) of a plurality of communication links as a function of a first alpha-term ($\tilde{\alpha}_{s1}$);

modulating the input signal ($V_m$) for the respective communication link in the corresponding group (N) of communication links as a function of a modal delay skew term ($\delta_T$) and a second alpha-term ($\tilde{\alpha}_{s2}$);

modulating an input signal for each of the other communication links in the corresponding group ($V_k$, for $1 \leq k \leq N$, $k \neq m$) as a function of the modal delay skew term ($\delta_T$) and a cross-coupling alpha-term ($\tilde{\alpha}_{xkm}$) for the respective other communication link; and combining the modulated input signals for each respective communication link as an encoder output signal for a corresponding communication link of the plurality of communication links.

11. The method according to claim 10, wherein:
for input signal ($V_m$), the first alpha-term comprises $$\tilde{\alpha}_{s1} = \sum_{j=1}^{N_h} \alpha_{kjm},$$

the second alpha-term comprises $$\tilde{\alpha}_{s2} = \sum_{j=N_h+1}^{N} \alpha_{kjm}$$

where $$k = m \text{ and } N_h = \begin{cases} \frac{N}{2}, & \text{for } N \in \text{ even} \\ \frac{N}{2} \pm 0.5, & \text{for } N \in \text{ odd} \end{cases}$$

for input signal ($V_m$), the cross-coupling alpha-term comprises $$\tilde{\alpha}_{xkm} = \frac{1}{N_h} \sum_{j=1}^{N_h} \sum_{i=1}^{j} \alpha_{kim}$$

where $$1 \leq k \leq N, k \neq m \text{ and } N_h = \begin{cases} \frac{N}{2}, & \text{for } N \in \text{ even} \\ \frac{N}{2} \pm 0.5, & \text{for } N \in \text{ odd} \end{cases}.$$

12. The method according to claim 10, wherein the determined channel response parameters include a channel response S-parameter matrix.

13. The method according to claim 10, wherein the modal delay-modulation term comprises a difference between a maximum modal delay and a minimum modal delay of the bundle.

14. The method according to claim 10, wherein the distortion characteristic is determined during a design stage of the device.

15. The method according to claim 10, wherein the distortion characteristic is determined during a manufacturing stage of the device.

16. The method according to claim 10, wherein the distortion characteristic is determined during use of the device.

17. The method according to claim 16, wherein the distortion characteristic is determined during an initialization of the device.

18. The method according to claim 16, wherein the distortion characteristic is determined periodically during use of the device.

19. A system comprising:
a communication channel including a plurality of communication links grouped into multiple bundles, each bundle including a number of communication links;
a channel characterization circuit to determine channel response parameters for the plurality of communication links; and
a modulation module to receive a plurality of input signals and generate, based on the determined channel response parameter for each one of a plurality of communication links, a corresponding output signal for transmission on each respective one of the plurality of communication links, wherein the modulation module is configured to,
modulate the input signal ($V_m$) for a respective communication link in a corresponding group (N) of communication links as a function of a first alpha-term ($\tilde{\alpha}_{s1}$);
modulate the input signal ($V_m$) for the respective communication link in the corresponding group (N) of communication links as a function of a modal delay skew term ($\delta_T$) and a second alpha-term ($\tilde{\alpha}_{s2}$); and
modulate an input signal ($V_m$) for each of the other communication links in the corresponding group ($V_k$, for 1≤k≤N, k≠m) as a function of the modal delay skew term ($\delta_T$) and a cross-coupling alpha-term ($\tilde{\alpha}_{xkm}$) for the respective other communication link.

20. The system of claim 19, wherein a first spacing between communication links within each bundle is less than a second spacing between corresponding communication links in adjacent bundles.

21. The system of claim 19, wherein the determined channel response parameters include a channel response S-parameter matrix.

22. The system of claim 19, wherein:
for input signal ($V_m$), the first alpha-term comprises $$\tilde{\alpha}_{s1} = \sum_{j=1}^{N_h} \alpha_{kjm},$$

for input signal ($V_m$), the second alpha-term comprises $$\tilde{\alpha}_{s2} = \sum_{j=N_h+1}^{N} \alpha_{kjm}$$

where $$k = m \text{ and } N_h = \begin{cases} \dfrac{N}{2}, & \text{for } N \in \text{ even} \\ \dfrac{N}{2} \pm 0.5, & \text{for } N \in \text{ odd} \end{cases}$$

for input signal ($V_m$), the cross-coupling alpha-term comprises $$\tilde{\alpha}_{xkm} = \frac{1}{N_h} \sum_{j=1}^{N_h} \sum_{i=1}^{j} \alpha_{kim}$$

where $$1 \le k \le N, k \ne m \text{ and } N_h = \begin{cases} \dfrac{N}{2}, & \text{for } N \in \text{ even} \\ \dfrac{N}{2} \pm 0.5, & \text{for } N \in \text{ odd} \end{cases}.$$

23. The system of claim 19, wherein the modal delay-modulation term comprises a difference between a maximum modal delay and a minimum modal delay of the bundle.

24. The system of claim 19, wherein the distortion characteristic is determined during a design stage of the device.

25. The system of claim 19, wherein the distortion characteristic is determined during a manufacturing stage of the device.

26. The system of claim 19, wherein the distortion characteristic is determined during use of the device.

27. The system of claim 26, wherein the distortion characteristic is determined during an initialization of the device.

28. The system of claim 26, wherein the distortion characteristic is determined periodically during use of the device.

* * * * *